United States Patent
Mosgrove

(10) Patent No.: US 6,418,493 B1
(45) Date of Patent: *Jul. 9, 2002

(54) METHOD AND APPARATUS FOR ROBUST ADDRESSING ON A DYNAMICALLY CONFIGURABLE BUS

(75) Inventor: Ronald L. Mosgrove, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,583

(22) Filed: Dec. 29, 1997

(51) Int. Cl.[7] .................................................. G06F 13/00
(52) U.S. Cl. ............................ 710/104; 710/8; 710/300
(58) Field of Search ................................. 395/284, 280, 395/828, 829, 281, 282, 283, 823; 710/100, 104, 101, 102, 103, 3, 8, 9, 26, 43, 4, 1, 2; 711/202, 203

(56) References Cited

U.S. PATENT DOCUMENTS

| | | | | |
|---|---|---|---|---|
| 4,730,251 A | * | 3/1988 | Aakre et al. | 395/284 |
| 4,933,845 A | * | 6/1990 | Hayes | 395/284 |
| 5,175,822 A | * | 12/1992 | Dixon et al. | 395/829 |
| 5,367,640 A | * | 11/1994 | Hamilton et al. | 395/830 |
| 5,493,656 A | * | 2/1996 | Tsukamoto | 395/280 |
| 5,544,333 A | * | 8/1996 | Frazier et al. | 395/304 |
| 5,628,027 A | * | 5/1997 | Belmont | 395/821 |
| 5,664,221 A | * | 9/1997 | Amberg et al. | 395/829 |
| 5,666,557 A | * | 9/1997 | Cassidy et al. | 395/828 |
| 5,761,448 A | * | 6/1998 | Adamson et al. | 395/284 |
| 5,761,455 A | * | 6/1998 | King et al. | 395/307 |

* cited by examiner

Primary Examiner—Peter S. Wong
Assistant Examiner—X. Chung-Trans
(74) Attorney, Agent, or Firm—Blakely, Sokoloff, Taylor & Zafman LLP

(57) ABSTRACT

The invention in one embodiment is a dynamically configurable bus system, including a dynamic bus; a bus device having a first guaranteed unique identifier and a first physical address on the dynamic bus; and a bus manager having a second guaranteed unique identifier and a second physical address on the dynamic bus. The bus manager maps the first and second guaranteed unique identifiers to the first and second physical addresses, respectively.

12 Claims, 3 Drawing Sheets

METHOD AND APPARATUS FOR ROBUST ADDRESSING ON A DYNAMICALLY CONFIGURABLE BUS

BACKGROUND OF THE INVENTION

1. Field of the Invention

This invention relates generally to dynamically configurable buses and, more particularly, to robust addressing on a dynamically configurable bus.

2. Description of the Related Art

A "bus" is a group of transmission media used to pass information from one location to another. One type of bus is a collection of wires used to transmit data and control information to the various internal components of a computer. Another type of bus is a collection of wires, fibers, or cables, used to transmit data and control information between "bus devices" such as computers, printers, and magnetic tape drives. The bus devices and the bus comprise a "bus system."

Exemplary applications for bus systems include universal serial bus ("USB") systems and Ethernet local area networks ("LANs") that, in turn, might comprise part of larger wide area networks ("WANs"). A bus may be used to implement a LAN, but not all bus systems are actual computer networks in the sense of a LAN. An bus system might simply be a group of devices on a bus wherein the bus is a channel among the devices. Thus, the term "bus system" as used herein shall encompass a group of bus devices transmitting and/or receiving information over a bus. The definition may encompass a LAN depending on the particular implementation.

A bus system, therefore, typically includes a bus to which several bus devices are coupled. Each bus device has a physical address on the bus at which it receives and/or from which it transmits information over the bus. Thus, a computer may transmit information over the bus from its physical address to a shared printer at the printer's physical address, provided both are part of the same bus system.

Historically, every bus device had a predetermined, unique, physical address on the bus to prevent confusion during information transmission. Because the physical address was predetermined and static, a device could assume that a particular device was, in fact, located at that address. In the recited example, the computer could send the information to the printer at the printer's assigned physical address confident that only the printer would receive or respond because only the printer would reside at the assigned physical address.

However, bus systems are evolving "ease of use" capabilities. One important ease of use capability is the ability to "hot swap" devices. "Hot swap"refers to the ability to add and remove devices while the bus system is operating, i.e., to reconfigure the dynamic bus system in a manner transparent to the user. This implies being able to add and/or remove devices from the system and to then dynamically restructure the addressing scheme used to communicate over the bus. Thus, if a plotter were removed and replaced with a printer, the bus system must be able to recognize the change and automatically adjust the addressing scheme to account for it. This is called "dynamic configuration" and bus systems capable of dynamic configuration are known as "dynamically configurable buses" or "dynamically configurable bus systems."

Dynamic configuration created a serious addressing problem: it violated the previously assumed static nature of physical addressing. A device could no longer assume the presence or absence of another device from previously known configuration information because the configuration is dynamic and may have changed since the system was last accessed. Bus systems therefore have had to adapt.

On dynamic buses, only certain activities may cause addresses to change. These activities will be called "configuration events." Configuration events such as powering on a bus, resetting a bus, insertion or removal of a device or any other event defined by the protocols appropriate for the bus implementation that may cause physical addresses to change. Configuration events are typically well known so that affected devices have the capability to detect that the configuration event has occurred. Even on a dynamic bus, physical addresses are static between configuration events.

Typically, after a configuration event, when a device wishes to communicate with another device over a dynamically configurable bus, the communicating bus device queries all the other bus devices until it finds the one with which it wishes to communicate. More particularly, the querying device accesses the bus one or more times to examine the configuration information for each device encountered. The querying device determines from the configuration information whether the encountered device is the one sought. If so, the physical address is retrieved and the communication conducted. Otherwise, the querying device continues on to the next bus device until it locates the desired bus device.

This propagation of addressing information requires substantial overhead, burdens the dynamic bus system, and consumes system resources that otherwise might be used more productively. In addition, the propagation of addressing information potentially produces user visible delays or interruption of services. Thus, although this approach works satisfactorily with small numbers of bus devices, it is unduly burdensome for large dynamic bus systems.

The overhead problem is exacerbated when the dynamic bus system includes power-managed bus devices. A power-managed device switches to a "sleep" state to reduce power consumption after a predetermined period of non-use. Many bus devices have limited capabilities for tracking dynamic events in the reconfiguration. The difficulty arises when the dynamic bus system is reconfigured and a device of this type is in the sleep state. Such devices cannot track dynamic events in the sleep state and must be awakened to do so, thereby hampering power management.

The present invention is directed to overcoming, or at least reducing the effects of, one or more of the problems set forth above.

SUMMARY OF THE INVENTION

The invention, in one embodiment, is a dynamically configurable bus system, including a dynamic bus; a bus device having a first guaranteed unique identifier and a first physical address on the dynamic bus; and a bus manager having a second guaranteed unique identifier and a second physical address on the dynamic bus. The bus manager maps the first and second guaranteed unique identifiers to the first and second physical addresses, respectively.

BRIEF DESCRIPTION OF THE DRAWINGS

Other objects and advantages of the invention will become apparent upon reading the following detailed description and upon reference to the drawings in which.

Figure 1:
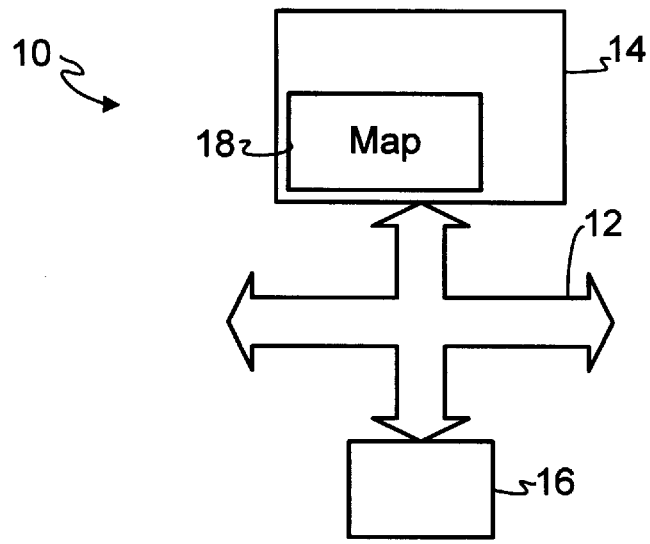
FIG. 1 illustrates an embodiment of a dynamically configurable bus system constructed and operated in accordance with the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates a dynamically configurable bus system 10 constructed and operated in accordance with a first embodiment of the invention. The system 10 generally comprises a dynamic bus 12, a bus manager 14, and a bus device 16, the bus manager 14 and the bus device 16 being coupled to the dynamic bus 12 in a conventional manner. The bus manager 14 includes a map 18, whose structure and function are set forth in more detail below.

The dynamic bus 12 may be any type of bus and may, in some embodiments, implement a LAN or part of a WAN (not shown). The dynamic bus 12 may, therefore, be any medium suitable for a particular implementation such as a twisted wire pair, a coaxial cable, or an optical fiber. The bus may operate in accord with any number of standards or protocols known to the art for this purpose, provided modifications are made to implement the invention as set forth below.

The bus manager 14 manages the bus, performing arbitration, allocation, and control as defined in the standards and protocols known to the art for this purpose and appropriate for the specific implementation. The bus manager 14 may be any of a number of bus device types appropriately programmed for this function and as are known in the art. For instance, the bus manager 14 may be an appropriately programmed personal computer or workstation in various alternative embodiments. The bus manager 14 has a memory subsystem (not shown) that includes some form of program storage device such as a random access memory ("RAM"), a hard disk, a floppy disk, or an optical disk. Some embodiments of the bus manager 14 might have more than one program storage device.

The bus manager 14 constructs and maintains the address map 18. The address map 18 maps a guaranteed unique identifier ("GUID") for each bus device to the respective physical address for that bus device. GUIDs and their use are well known in the art and, in addition to being unique, are guaranteed to be constant. GUIDs are typically installed by the manufacturer and never changed afterward. However, before communication may be established, the physical address associated with the GUID must be ascertained. Thus, a GUID is assigned to each of the bus manager 14 and the bus device 16 in a manner known to the art. In the embodiment illustrated, the map 18 maps the GUIDs of the bus manager 14 and the bus device 16 to their respective physical addresses on the dynamic bus system 10. The map 18 is bi-directional so that a physical address may be located from a GUID and a GUID can be located from a physical address.

The map 18 may be implemented as a data structure encoded on some form of random access memory such as a hard disk or a floppy disk. Many suitable data structures are known to the art. For instance, the map 18 may be implemented as any type of storage mechanism, such as an array, a doubly linked list, a tree, a table, or a simple file, provided the structure suitably enables the bi-directional determination of GUIDs and physical addresses. The particular structure with which the map 18 is implemented is not material to the practice of the invention, although some particular implementations might favor one structure over another.

In some embodiments, the map 18 will be implemented by an "address manager." The address manager may be a software application resident on some program storage medium associated with the bus manager 14. For instance, the address manager may comprise computer readable instructions encoded on a program storage medium (not shown) such as a random access memory, a hard disk, a floppy disk, or an optical disk. The address manager, in such embodiments, would gather the necessary information and create the data structure that comprises the map 18.

The map 18 is shown resident on the bus manager 14 in FIG. 1. Although this has many advantages, it is not necessary to the practice of the invention. The map 18 may be stored on another bus device, such as an external hard disk (not shown), that may be accessed over the dynamic bus 12. Similarly, in embodiments employing an address manager, the address manager may advantageously be employed resident on the bus manager 14. The invention nevertheless contemplates that an address manager might be resident on another bus device from which it may be invoked over the dynamic bus 12 upon power-on or reset.

Figure 3:
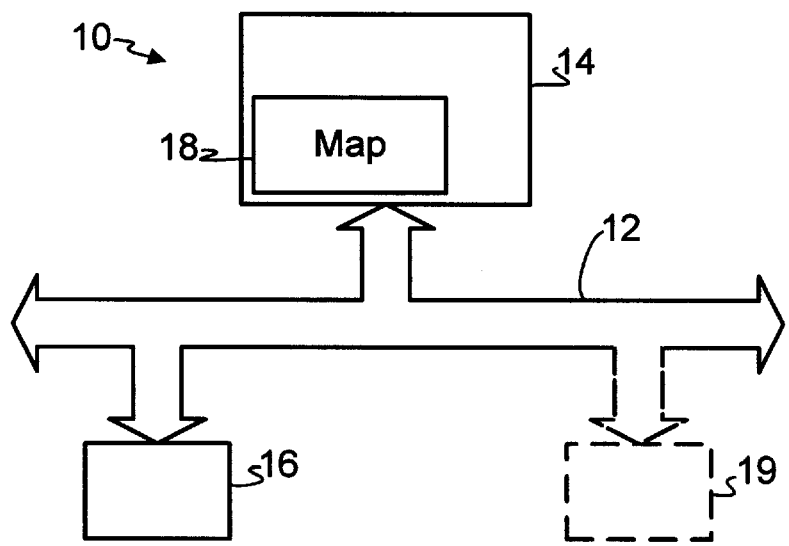
FIG. 3 depicts the insertion or removal of a bus device from the dynamic bus system of FIG. 1.
Figure 2:
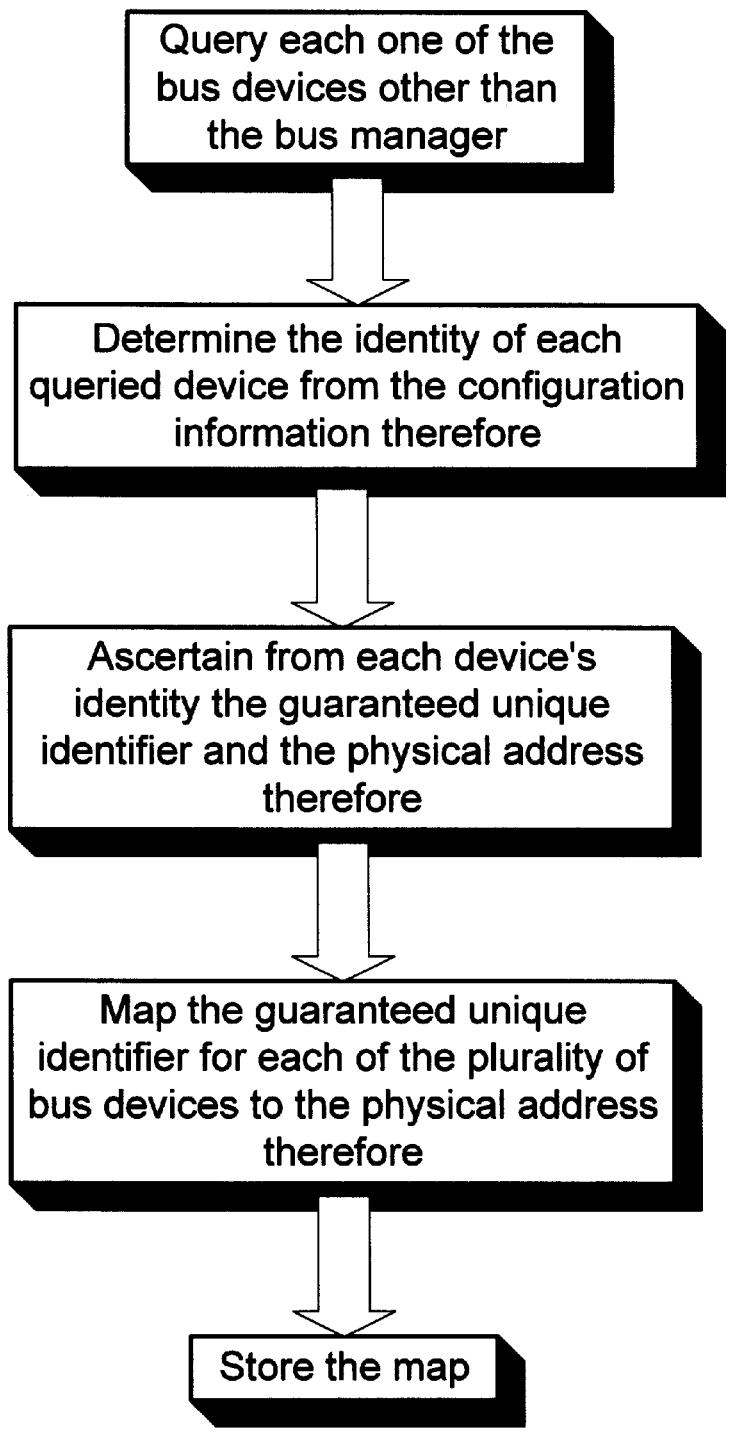
FIG. 2 illustrates one embodiment of a method performed in accordance with present invention.

FIG. 2 illustrates one embodiment of a method performed in accordance with the present invention. The method of FIG. 2 is performed whenever a configuration event, as earlier described, occurs on the bus system 10, configuration events being the occasions on which the map 18 is generated and stored. Referring now to FIG. 3, a bus device 19 is illustrated in ghosted lines, indicating its insertion into or removal from the bus system 10. Any such insertion or removal will cause a configuration event on the bus system 10. Any configuration event will invoke the method of FIG. 2.

Referring to both FIG. 2 and FIG. 3, the method begins by querying, upon detection of a configuration event, each one of the bus devices 16 and 19 other than the bus manager 14 and determining the identity of each queried device 16 and 19 from their configuration information. Each device 14, 16, and 19 has a GUID and a physical address assigned to it in the manner customarily used in the art. From the device's identity, the bus manager 14 ascertains the GUID and the physical address for the devices 16 and 19. The bus manager 14 then maps the GUID for each of the bus devices 16 and 19 to the physical address therefor. This map 18 is then stored and can then be used whenever any bus device 14, 16, or 19 wishes to transmit to another over the dynamic bus 12.

Figure 4:
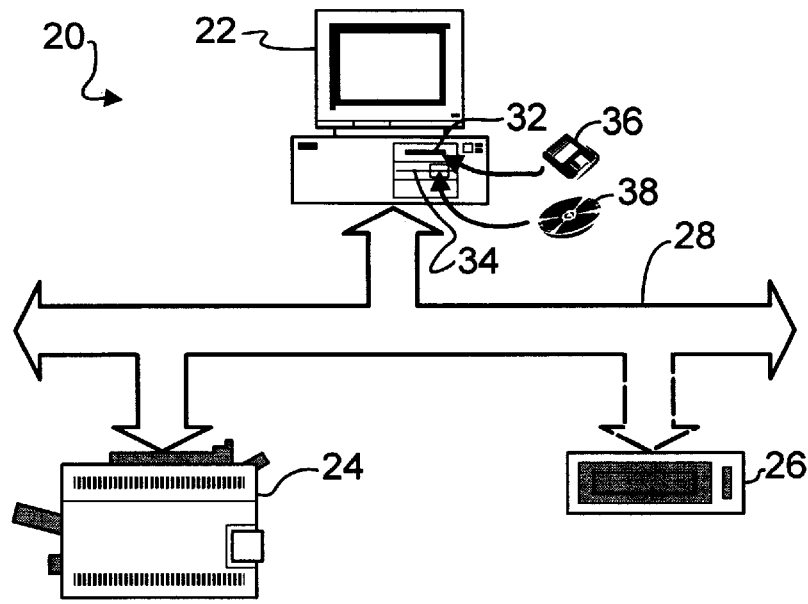
FIG. 4 depicts one particular embodiment of the dynamic bus system illustrated in FIG. 1.

FIG. 4 depicts a dynamically configurable bus system 20 that is one particular embodiment of the bus system 10 in FIG. 1. The bus system 20 includes a workstation 22, a printer 24, and a magnetic tape drive 26, all electrically coupled to a dynamic bus 28. The term "workstation" is used in both a specific and a general sense. Specifically, the workstation 22 is a workstation in the sense of a dedicated, applications oriented computer with high resolution graphics capability. However, in embodiments where the bus system 20 implements a LAN, the workstation 22 may be a workstation in the sense of a single-user computer on the LAN.

The workstation 22 acts as the bus manager in this particular embodiment. Note that the scope of the invention is not limited to workstations as bus managers. The workstation 22 includes a floppy disk drive 32 and an optical disk drive 34 into which a floppy disk 36 and an optical disk 38, respectively, may be inserted. The floppy disk 36 is a program storage device on which the map 18, shown in FIG. 1, may be stored. The optical disk 38 is a program storage device on which the instructions for implementing the invention may be stored.

The printer 24 and the magnetic tape drive 26 are merely representative bus devices. Other types of bus devices, such as a video camera, may be employed in other embodiments. In the embodiment of FIG. 4, neither the printer 24 nor the magnetic tape drive 26 has the capability to manager the bus 28, although the workstation 22 does.

Figure 5:
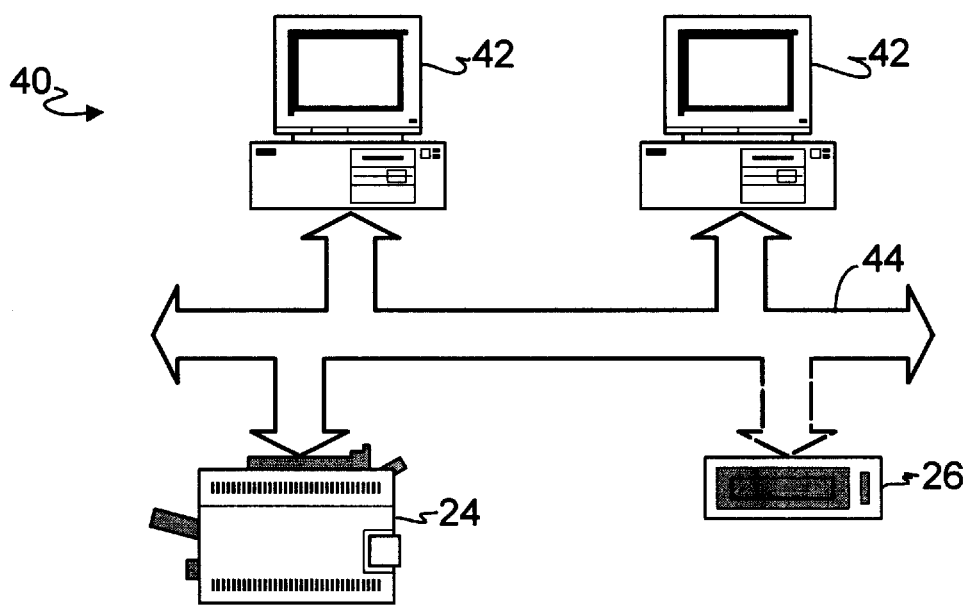
FIG. 5 illustrates the insertion and/or removal of a bus device from the dynamic bus system of FIG. 4.

FIG. 5 illustrates a particular embodiment in which a dynamic bus system 40 includes two potential bus managers 42. Each of the potential bus managers 42 is a workstation such as the workstation 22 in FIG. 4. The two workstations 42 in FIG. 5 may each have the ability to be a bus manager, but only one may be bus manager at any given time. As will be appreciated by those skilled in the art having the benefit of this disclosure, the two workstations 42 will arbitrate each time the bus system 40 is reset or powered on to determine which will be the bus manager. The designated bus manager then remains bus manager until the next power-on or reset, at which time the workstations 42 re-arbitrate. The bus system 40 in FIG. 5 otherwise operates in a manner analogous to that of the embodiments in FIGS. 1–3.

As can be seen from the above discussion, the invention is particularly suited to address the problems earlier mentioned. The construction and maintenance of the map alleviates the need to propagate physical addressing information as a bus device may simply access the map. Individual devices furthermore are relieved of the necessity to constantly track all dynamic events in lieu of the bus manager's mapping activities. Thus, sleeping bus devices may continue to sleep through dynamic events. Still other advantages may accrue through use of the invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer readable program storage device encoded with instructions that, when executed by a computer, cause a bus manager in a first bus device to access a map in a second bus device to map each of a plurality of manufacturer installed guaranteed unique identifiers to a respective physical address of one of a plurality of bus devices in a bus system in automatic response to a configuration event causing a change in at least one of the physical addresses;

wherein the first device is not the second device and the first and second devices are on the first bus;

wherein mapping each of a plurality of manufacturer-installed guaranteed unique identifiers to a respective physical address comprises:

querying each of the plurality of bus devices;

determining an identity of each queried device;

ascertaining the manufacturer-installed guaranteed unique identifier and a physical address for each identified device;

constructing a map of the manufacturer-installed guaranteed unique identifier for each of the plurality of bus devices to the physical address therefor; and storing the map.

2. The program storage device of claim 1, wherein the map comprises at least one of an array, a doubly linked list, a tree, a table, and a file.

3. A method for addressing on a bus, comprising:

querying each of a plurality of bus devices on a bus by a bus master in automatic response to a configuration event causing a change in a physical address of at least one of the plurality of bus devices;

determining an identity of each queried device;

ascertaining a guaranteed unique identifier installed by a manufacturer of said each of the plurality of bus devices and the physical address for each identified device;

creating a map by mapping the guaranteed unique identifier for each of the plurality of bus devices to the physical address therefor; and storing the map in a storage device other than the bus master, wherein the storage device is one of the plurality of bus devices.

4. The method of claim 3, wherein the configuration event includes one of powering on a bus, resetting a bus, insertion of a fist of the plurality of bus devices, and removal of a second of the plurality of bus devices.

5. The method of claim 3, wherein the bus manager comprises one of a workstation and a personal computer.

6. The method of claim 3, wherein mapping the guaranteed unique identifier comprises mapping each said guaranteed unique identifier and a respective physical address into at least one of an array, a doubly linked list, a tree, a table, and a file.

7. The method of claim 3, wherein mapping the guaranteed unique identifier comprises bi-directionally mapping the guaranteed unique identifier.

8. A program storage device encoded with instructions that, when executed by a computer, perform a method comprising:

querying each of a plurality of bus devices on a bus by a bus master in automatic response to a configuration event causing a change in at least one of a plurality of physical addresses associated with the plurality of bus devices;

determining an identity of each queried device and the bus manager;

ascertaining a guaranteed unique identifier installed by a manufacturer of said each of the plurality of bus devices and the physical address for each identified device and for the bus manager;

creating a map by mapping the guaranteed unique identifier for each of the plurality of bus devices and the bus manager to the physical address therefor; and storing the map in a storage device other than the bus master, wherein the storage device is one of the plurality of bus devices.

9. The program storage device of claim 8, wherein the configuration event includes one of powering on a bus, resetting a bus, insertion of a first of the plurality of bus devices, and removal of a second of the plurality of bus devices.

10. The program storage device of claim 8, wherein the bus manager comprises one of a workstation and a personal computer.

11. The program storage device of claim 8, wherein mapping the guaranteed unique identifier comprises mapping each said guaranteed unique identifier and a respective physical address into at least one of an array, a doubly linked list, a tree, a table, and a file.

12. The program storage device of claim 8, wherein mapping the guaranteed unique identifier comprises bi-directionally mapping the guaranteed unique identifier.

* * * * *